United States Patent
Murgesan et al.

(10) Patent No.: US 11,970,657 B2
(45) Date of Patent: Apr. 30, 2024

(54) CARBONATE-BASED SOLVENTS FOR SCALE-SQUEEZE ENHANCEMENT

(71) Applicant: Baker Hughes Oilfield Operations LLC, Houston, TX (US)

(72) Inventors: Sankaran Murgesan, Katy, TX (US); Jerry J. Weers, Richmond, TX (US); Onome Ugono, Rosenberg, TX (US); Jeffrey A. Russek, Pearland, TX (US); Dong Lee, Stafford, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 17/826,093

(22) Filed: May 26, 2022

(65) Prior Publication Data

US 2023/0383172 A1 Nov. 30, 2023

(51) Int. Cl.
| C09K 8/528 | (2006.01) |
| C09K 23/38 | (2022.01) |
| C09K 23/40 | (2022.01) |
| C09K 23/56 | (2022.01) |

(52) U.S. Cl.
CPC .............. *C09K 8/528* (2013.01); *C09K 23/38* (2022.01); *C09K 23/40* (2022.01); *C09K 23/56* (2022.01)

(58) Field of Classification Search
None
See application file for complete search history.

(56) References Cited

U.S. PATENT DOCUMENTS

| 3,402,770 | A | 9/1968 | Messenger |
| 7,753,123 | B2 | 7/2010 | Fuller |
| 10,106,721 | B2 | 10/2018 | Yue et al. |
| 10,550,308 | B2 | 2/2020 | Blumer et al. |
| 2008/0006406 | A1 | 1/2008 | Nguyen et al. |
| 2014/0305646 | A1 | 10/2014 | Chew et al. |
| 2015/0027702 | A1* | 1/2015 | Godoy-Vargas ....... C09K 8/512 507/224 |
| 2016/0362599 | A1 | 12/2016 | Wadekar et al. |
| 2017/0130122 | A1* | 5/2017 | Reyes ................... C09K 8/035 |
| 2017/0342309 | A1 | 11/2017 | Yue et al. |
| 2019/0040299 | A1 | 2/2019 | Blumer et al. |
| 2020/0190394 | A1 | 6/2020 | Moorhouse et al. |
| 2020/0231864 | A1* | 7/2020 | Saini .................... C09K 8/845 |

FOREIGN PATENT DOCUMENTS

GB 2580860 A 8/2020

OTHER PUBLICATIONS

Ghosh, Bisweswar, et al., "Preflush Design for Oil-Wet Carbonate Formations: Key to Enhance Scale-Inhibitor-Squeeze Lifetime," SPE 178910, SPE Journal, Jul. 1-10, 2015.
Kan, Amy T., "The state of the art in scale inhibitor squeeze treatment," Petroleum Science, Aug. 2020, 17, 1579-1601.
Vazquez, O., et al. "Impact of Mutual Solvent Preflushes on ScaleSqueeze Treatments: Extended Squeeze Lifetime and Improved Well Clean-up Time," SPE 121857, May 1-14, 2009.
Arab, M. M., et al.; "Mutual Solvent Driven Inorganic Precipitation in the Pre-flush Stage of Squeeze Treatments," SPE 179033-MS, Feb. 1-12, 2016.
Bogaert, P., et al.; "Scale Inhibitor Squeeze Treatments Deployed From an FPSO in a Deepwater, Subsea Field in the Campos Basin," SPE 102503, Sep. 1-27, 2006.
International Search Report and Written Opinion issued in connection with corresponding PCT Application No. PCT/US2023/023696.

* cited by examiner

*Primary Examiner* — Andrew Sue-Ako
(74) *Attorney, Agent, or Firm* — Crowe & Dunlevy, P.C.

(57) ABSTRACT

A scale inhibitor squeeze treatment is enhanced by injecting a pre-flush solution into a wellbore, where the pre-flush solution includes at least one organic carbonate solvent, such as a dialkyl carbonate and/or a cyclic carbonate. The use of an organic carbonate solvent can help prevent the pre-flush solution emulsion formation, help avoid water-blocking, and enhance scale inhibitor adsorption. The use of an organic carbonate solvent also permits the pre-flush solution to be free of water, in one non-limiting embodiment.

10 Claims, No Drawings

CARBONATE-BASED SOLVENTS FOR SCALE-SQUEEZE ENHANCEMENT

TECHNICAL FIELD

The present invention relates to methods and compositions for using scale inhibitors, and more particularly relates to methods and compositions for introducing scale inhibitor squeeze treatments downhole in a subterranean formation in association with a hydrocarbon recovery operation.

BACKGROUND

Scale is a persistent problem for the production of oil and gas. As brine, oil, and/or gas proceed from the formation to the surface, the pressure and temperature change and dissolved salts can precipitate out. This can be called "self-scaling." Furthermore, if brine is injected into the formation to maintain pressure and sweep the oil to the producing wells, there will eventually be a commingling of the brine with the formation water, and additional salts may precipitate. This can be called scaling from "incompatible waters."

The most common oilfield scales are calcite (most stable polymorph of calcium carbonate or $CaCO_3$), barite ($BaSO_4$), celestite ($SrSO_4$), anhydrite (anhydrous calcium sulfate or $CaSO_4$), gypsum ($CaSO_4 \cdot 2H_2O$), iron sulfide (FeS), and halite (rock salt of NaCl). More "exotic" scales such as calcium fluorite (halide mineral composed of calcium fluoride, $CaF_2$), zinc sulfide (ZnS), and lead sulfide (PbS and $PbS_2$) are sometimes found within high temperature/high pressure (HT/HP) wells.

Generally, calcite deposition is a self-scaling process. The main driver for its formation is the loss of carbon dioxide ($CO_2$) from the water to the gas phase(s) as pressure falls. This removes carbonic acid from the water phase, which had kept the basic calcite dissolved. Calcite solubility can also decrease with increasing temperature (at constant $CO_2$ partial pressure).

Halite scaling is also a self-scaling process. The driving forces are falling temperature and evaporation. Halite solubility in water decreases with decreasing temperature, favoring halite dropout during the production of high total dissolved solids (TDS) brines to the surface. Falling pressure has a much smaller effect on decreasing halite solubility. Evaporative loss of liquid water is generally the result of gas breakout from under-saturated condensate in oil wells, as well as from the expansion of gas in gas wells. The increase in water vapor can leave behind insufficient liquid water to maintain halite solubility in the co-produced brine phase. Halite self-scaling is found with both low-temperature and high-temperature wells (e.g., with 125 and 350° F. bottom-hole temperature (BHT) gas/gas condensate wells).

Barite scales are generally the result of mixing incompatible waters. For instance, seawater is often injected into offshore reservoirs for pressure maintenance. Seawater has high-sulfate content; formation waters often have high-barium contents. Mixing these waters often results in barite deposition. If this mixing/precipitation occurs within the reservoir far from a vertical wellbore, there will generally be little impact on the production of hydrocarbons, but scaling near or within the wellbore will have a significant negative impact on production. Mixing of incompatible waters within the sand pack of a hydraulically fractured well can also be detrimental to production. Furthermore, after the initial, large deposition of scale, this water continues to be saturated in barite and additional barite scale may continue to form in the wellbore as pressure and temperature fall.

Waterfloods combining ground waters with high calcium and high sulfate contents can deposit anhydrite or gypsum by much the same "incompatible waters" mechanism discussed for barite. However, calcium sulfate scale solubility, unlike that of barite scale, can increase with decreasing temperature (until about 40° C.), although this can vary with NaCl concentration. This can decrease the likelihood of scale after the initial mixing deposition. The reversal in solubility falloff below 40° C. accounts for the gypsum scaling observed in surface equipment. This inverse temperature effect can result in the generation of anhydrite scale when injecting seawater. Anhydrite solubility falls as pressure falls.

Iron sulfide scales are almost ubiquitous when hydrogen sulfide is produced—often the result of tubular corrosion in the presence of $H_2S$. The chemistry is complicated; more than one iron sulfide phase can be present. The physical properties of the phases vary (sometimes dense, sometimes not), and the phase composition can change with time.

Scaling damage can be very rapid, and the effects very expensive. Production can fall from tens of thousands of BPD to zero in just a day because of scaling. The cost for cleaning out a single well and putting it back on production can be approximately the same as the chemical costs to treat the entire field. While not all wells are susceptible to such momentous penalties for permitting scaling to occur, it is apparent that scale prevention, formation, and remediation, have associated costs.

It is expected that oilfield scaling problems will continue to worsen and become more expensive over time due to increased use of longer tieback liners, increased implementation of "smart" wells where integrity is more critical, increased gas production since gas well formations tend to be more sensitive, an increased need to use greener chemicals, and increasing amounts of produced water.

Scale remediation techniques must be quick and nondamaging to the wellbore, tubing, and the reservoir. Selecting the best scale-removal technique for a particular well depends on knowing the type and quantity of scale, its physical composition, and its texture.

If the scale is in the wellbore, it can be removed mechanically or dissolved chemically. Mechanical methods, including milling and jetting, are among the most successful methods of scale removal in tubulars. Chemical dissolution of certain wellbore scales is typically relatively inexpensive and can used when mechanical removal methods are ineffective or costly. However, these chemical and mechanical removal methods are reactive, not proactive. The use of scale inhibitors to initially prevent or mitigate scaling would be a proactive method of dealing with the scaling problem, and thus is generally preferred over reactive approaches.

Most inhibitors for inorganic scales are phosphorous compounds: inorganic polyphosphates, organic phosphate esters, organic phosphonates, organic aminophosphates, and organic polymers. A wide variety of scale inhibitors are well-known, and they are commercially available from many companies.

The most frequently used method of delivering the inhibiting solution to the scaling brine has been the "scale inhibitor squeeze treatment." In this method, an inhibitor-containing solution is forced (hence the term "squeeze") into the formation, where the inhibitor then resides on the rock surface, slowly leaching back into the produced-water phase at or above the critical concentration needed to prevent scaling (the minimum inhibitor concentration or "MIC"). Thus, the concentration of the scale inhibitor affects its effectiveness.

It is intended that the released inhibitor protect the tubulars, as well as the near wellbore. It is thus required that the inhibitor adsorb on the formation rock with sufficient capacity to provide relatively long-term protection. It is also required that the inhibitor be relatively stable to thermal degradation under down-hole conditions and be compatible with the particular brine system. It is also important that the inhibitor treatment not cause a significant permeability reduction and reduced production. These requirements are generally achievable, but again, one chemical does not necessarily fit all field situations.

A goal can be to adsorb the inhibitor onto the rock by a physico-chemical process, sometimes called an "adsorption squeeze". Adsorption of inhibitors is thought to occur through electrostatic and van der Waals interactions between the inhibitor and formation minerals. The interaction may be described by an adsorption isotherm, which is a function of pH, temperature, and mineral substrate. The adsorption process for retaining inhibitor in the formation can be most effective in sandstone formations. Treatment lifetimes are generally on the order of 3 to 6 months.

The engineering design of such adsorption squeeze treatments into real-world multilayer formations can generally done with simulation software. This simulator takes core flood data and computes the proper pre-flushes, inhibitor volumes, post flushes, and potential squeeze lifetime.

Conventional squeeze treatments include five stages, namely: (1) pre-flush, (2) main treatment, (3) post-flush, (4) shut-in, and (5) back-production stages. In the pre-flush stage, a mutual solvent (MS) is often applied to the formation either neat or in a blend of water and/or other additives. This practice is believed to offer numerous benefits by preventing emulsion formation, water-blocking avoidance and enhancements to scale inhibitor (SI) adsorption through oil and water displacement.

It is a continuing goal to improve scale inhibitor squeeze treatments by making the process and compositions more environmentally acceptable, as well as reduce the costs of operations and materials.

SUMMARY

There is provided, in one form, a scale inhibitor squeeze treatment method, where the treatment includes injecting a pre-flush solution into a wellbore; injecting a main treatment solution containing at least one scale inhibitor into the wellbore; injecting a post-flush solution into the wellbore; shutting-in the well for a period of time; and subsequently producing oil from the wellbore; where the improvement comprises where the pre-flush solution includes at least one organic carbonate solvent selected from the group consisting of a dialkyl carbonate, a cyclic carbonate, and combinations thereof; optionally at least one surfactant; optionally at least one co-surfactant; optionally at least one co-solvent; and optionally at least one hydrocarbon.

Additionally, there may be provided in a non-limiting embodiment, a pre-flush solution for use in a downhole scale inhibitor squeeze treatment where the pre-flush solution includes at least one organic carbonate solvent selected from the group consisting of a dialkyl carbonate, a cyclic carbonate, and combinations thereof; optionally at least one surfactant; optionally at least one co-surfactant; optionally at least one co-solvent; and optionally at least one hydrocarbon. In another non-limiting embodiment, a pre-flush solution for use in a downhole scale inhibitor squeeze treatment where the pre-flush solution includes at least one organic carbonate solvent selected from the group consisting of a dialkyl carbonate, a cyclic carbonate, and combinations thereof; and at least one other component from the group including, but not necessarily limited to, at least one surfactant; at least one co-surfactant; at least one co-solvent; and at least one hydrocarbon.

DETAILED DESCRIPTION

It has been discovered that di-alkyl and cyclic carbonates are environmentally friendly solvents as components for pre-flush solutions in scale inhibitor squeeze treatments. These di-alkyl and cyclic carbonates have the ability to make water-free compositions for pre-flush solutions together with mixtures of surfactant and co-surfactants, and they facilitate the removal of water and other soluble components from the flow path of the hydrocarbon (i.e., oil and gas).

In one non-limiting embodiment, these pre-flush compositions are water-free mixtures of surfactants, co-surfactants, co-solvents, and hydrocarbons, which can form emulsions (especially micro-emulsions, and in another non-restrictive version Winsor Type III and/or Winsor Type IV microemulsions) with water and therefore remove water from the oil flow path while permitting the production of oil back after the squeeze treatment. The wells treated with the unique pre-flush chemicals described herein are expected to produce oil at rates equal to or higher than before the scale inhibitor squeeze treatment.

It is expected that mutual solvent compositions comprising organic carbonates (e.g., propylene carbonate) and other components like alcohol and/or chelating moieties serve to form more environmentally responsible cleaning solutions in scale inhibitor squeeze treatments. These serve to act as effective mutual solvents affording a clean wellbore prior to applying a scale squeeze treatment.

The pre-flush solution described herein offers an environmentally responsible option for downhole cleaning applications. This is because the base solvents (organic carbonates) are completely biodegradable. Additionally, this preflush solution also offers a cost-effective option because the base solvents may be manufactured conveniently and relatively inexpensively, and may be effectively recycled.

In more detail, as noted, the solvent used in this pre-flush solution includes at least one organic carbonate selected from the group consisting of a dialkyl carbonate, a cyclic carbonate, and combinations thereof. Suitable organic carbonates include, but are not necessarily limited to propylene carbonate, ethylene carbonate, glycerol carbonate, dimethyl carbonate, diethyl carbonate, dibutyl carbonate, and combinations thereof. There are no particular limits as to the proportions of organic carbonates when they are used together. For instance, one non-restrictive suitable combination is 25% glycerol carbonate in propylene carbonate (the balance). Another non-limiting alternative is 25% ethylene carbonate in propylene carbonate. In a different non-limiting embodiment, 21% glycerol carbonate in dimethyl carbonate (as the balance) is a suitable proportion.

In one non-limiting embodiment, the use of these organic carbonates permits the pre-flush solution to have an absence of water. The absence of water means that more water can be displaced prior to SI introduction.

Conventional pre-flush solutions often use alcohols and glycols. However, in another non-restrictive version herein, the pre-flush solution has an absence of an alcohol. Nevertheless, the pre-flush solution described herein is compatible with alcohols and glycols. This may be helpful if the pre-flush solution described herein incidentally mixes with a conventional pre-flush solution. Alternatively, the pre-flush solution described may be intentionally combined with a conventional pre-flush solution.

The pre-flush solution will also have at least one surfactant. Suitable surfactants include, but are not necessarily limited to, oxyalkylated alcohols, nonylphenols, oxyalkylated fatty alcohol-based surfactants, and combinations thereof. The pre-flush solution may optionally have a co-surfactant. Suitable co-surfactants include, but are not necessarily limited to, alkylpolyglucosides.

The pre-flush solution also contains at least one co-solvent. Suitable co-solvents include, but are not necessarily limited to, an alcohol in turn selected from the group consisting of ethanol, butanol, isopropyl alcohol, and combinations thereof.

Finally, the pre-flush solution contains at least one hydrocarbon. Suitable hydrocarbons include, but are not necessarily limited to, limonene, α-pinene, dipentene, and combinations thereof.

The pre-flush solution may be used at full strength; that is, without any diluents. The proportions of the various components of the pre-flush solution may be in the following ranges in non-limiting embodiment:

about 10 independently to about 100 volume % organic carbonate solvent; alternatively, from about 10 independently to about 50 vol %; where the upper threshold for the organic carbonate solvent proportion can variously be about 90 vol %, about 91 vol %, about 92 vol %, about 93 vol %, about 94 vol %, about 95 vol %, about 96 vol %, about 97 vol %, about 98 vol %, or 99 vol %;

about 0 independently to about 10 volume % surfactant; alternatively, from about 0 independently to about 1 vol %;

about 0 independently to about 10 volume % co-surfactant; alternatively, from about 0 independently to about 0.1 vol %;

about 0 independently to about 50 volume % co-solvent; alternatively, from about 0 independently to about 10 vol %; and about 0 independently to about 10 volume % hydrocarbon; alternatively, from about 0 independently to about 1 vol %.

As used herein with respect to a range, the word "independently" means that any lower threshold may be used together with any upper threshold to give a suitable alternative range.

Current simulations suggest that the organic carbonate solvent can replace water from a water-saturated core under experimental conditions. It is expected that in some non-limiting embodiments, the pre-flush solution described herein may displace both water and oil simultaneously to give enhanced cleaning behavior. Displacing water and/or oil helps subsequent SI adsorption in the main treatment solution injection of the SI.

It will be appreciated that the method and composition described herein is focused on the first part of a scale inhibitor squeeze treatment. It will be appreciated that the scale inhibitor squeeze treatment will also comprise subsequent steps including, but not necessarily limited to, injecting a main treatment solution containing at least one scale inhibitor into the wellbore, injecting a post-flush solution into the wellbore, shutting-in the well for a period of time, and subsequently producing oil from the wellbore. These subsequent steps may be performed using conventional processes and compositions.

Suitable scale inhibitors include, but are not necessarily limited to, phosphorous compounds: phosphonates including organic phosphonates, inorganic polyphosphates, phosphate esters such as organic phosphate esters, organic polymers, polycarboxylic acids, copolymers with chelating groups, and combinations thereof. These scale inhibitors are present in the main treatments solution that is introduced into the wellbore after introduction of the pre-flush solution.

In more detail, the scale inhibitor may be an inorganic polyphosphate including, but not necessarily limited to the following:

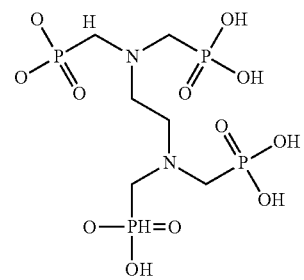

Ethylenediaminetetramethylene phosphonic acid

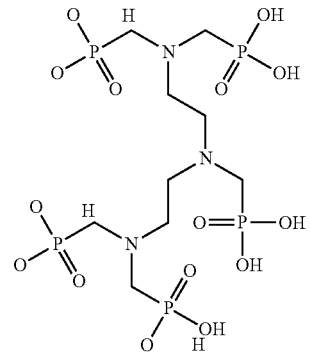

Diethylenetriaminepentamethylene phosphonic acid

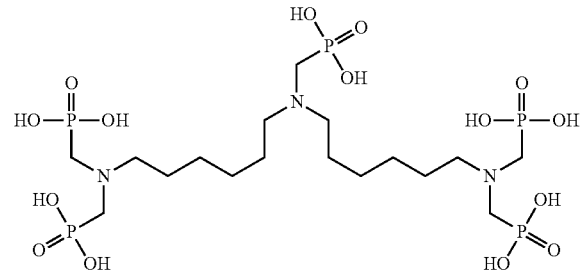

Bis(hexamethylene triamine penta(methylene phosphonic acid) (HMTPMP).

Suitable organic polymers for use as scale inhibitors may include the following organic phosphonate scale inhibitors:

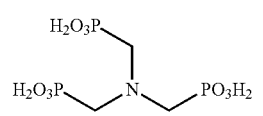

aminotris(methylenephosphonic acid) (ATMP)

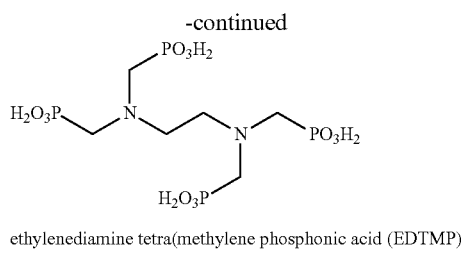

ethylenediamine tetra(methylene phosphonic acid (EDTMP)

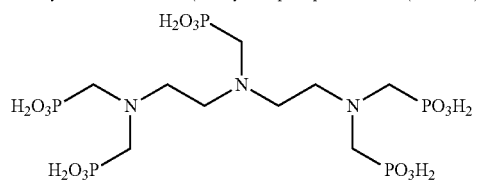

diethylenetriamine penta(methylene phosphonic acid (DETPMP)

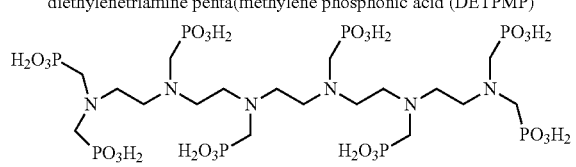

pentaethylenehexamineoctakismethylene phosphonic acid (PEHOMP)

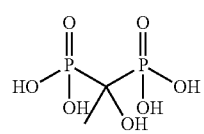

hydroxy ethylidene diphosphonic acid (HEDP)

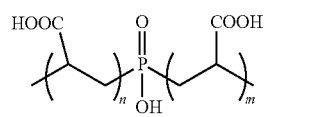

phosphino-polycarboxylic acid (PPCA)

Homopolymeric structures for maleic anhydride, maleic acid, acrylic acid, and methacrylic acid:

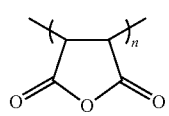 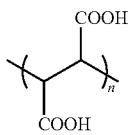

Polymaleic anhydride    Polymaleic acid

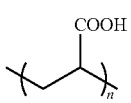 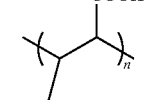

Polyacrylic acid    Polymethacrylic acid

Structures for copolymeric scale inhibitors:

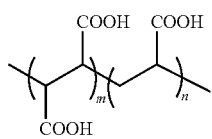

Poly(acrylic acid-co-maleic acid)

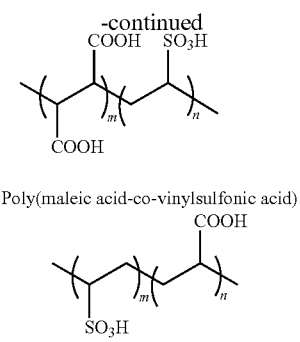

Poly(maleic acid-co-vinylsulfonic acid)

Poly(acrylic acid-co-vinylsulfonic acid)

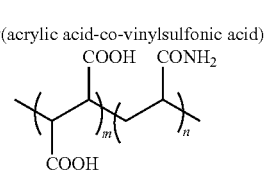

Poly(acrylic amide-co-maleic acid)

Structures for polyepoxysuccinic acid and polyaspartic acid:

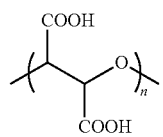

Polyepoxysuccinic acid

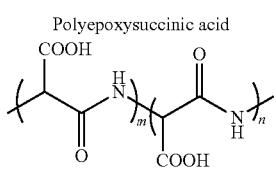

Polyaspartic acid

In the foregoing specification, the invention has been described with reference to specific embodiments thereof. However, it will be evident that various modifications and changes can be made thereto without departing from the broader scope of the invention as set forth in the appended claims. Accordingly, the specification is to be regarded in an illustrative rather than a restrictive sense. For example, different pre-flush solutions, organic carbonate solvents, surfactants, co-surfactants, co-solvents, hydrocarbons; subterranean formations, scale inhibitor squeeze treatment procedures, proportions, dosages, temperatures, and amounts not specifically identified or described in this disclosure or not evaluated in a particular Example are still expected to be within the scope of this invention.

The present invention may suitably comprise, consist of, or consist essentially of the elements disclosed and may be practiced in the absence of an element not disclosed. For instance, there is provided a scale inhibitor squeeze treatment method, where the treatment comprises, consists essentially of, or consists of, injecting a pre-flush solution into a wellbore; injecting a main treatment solution containing at least one scale inhibitor into the wellbore; injecting a post-flush solution into the wellbore; shutting-in the well for a period of time; and subsequently producing oil from the wellbore, where the pre-flush solution comprises, consists essentially of, or consists of at least one organic carbonate solvent selected from the group consisting of a dialkyl carbonate, a cyclic carbonate, and combinations thereof; optionally at least one surfactant; optionally at least one co-surfactant; optionally at least one co-solvent; and optionally at least one hydrocarbon.

The words "comprising" and "comprises" as used throughout the claims, are to be interpreted to mean "including but not limited to" and "includes but not limited to", respectively.

As used herein, the singular forms "a," "an," and "the" are intended to include the plural forms as well, unless the context clearly indicates otherwise.

As used herein, the term "about" in reference to a given parameter is inclusive of the stated value and has the meaning dictated by the context (e.g., it includes the degree of error associated with measurement of the given parameter).

As used herein, the term "and/or" includes any and all combinations of one or more of the associated listed items.

What is claimed is:

1. A scale inhibitor squeeze treatment method, the treatment comprising:
    injecting a pre-flush solution into a wellbore;
    injecting a main treatment solution containing at least one scale inhibitor into the wellbore;
    injecting a post-flush solution into the wellbore;
    shutting-in the well for a period of time; and
    subsequently producing oil from the wellbore;
    where the pre-flush solution comprises:
        at least one organic carbonate solvent selected from the group consisting of glycerol carbonate, dimethyl carbonate, diethyl carbonate, dibutyl carbonate, and combinations thereof;
        at least one surfactant, wherein the at least one surfactant is a nonylphenol;
        optionally at least one co-surfactant;
        optionally at least one co-solvent; and
        optionally at least one hydrocarbon.

2. The method of claim 1 where the at least one organic carbonate is present in the pre-flush solution in an amount ranging from about 10 vol % to about 100 vol %.

3. The method of claim 1 where the pre-flush solution has an absence of water.

4. The method of claim 1 where the pre-flush solution has an absence of an alcohol.

5. The method of claim 1 where:
    the pre-flush solution comprises the at least one co-solvent, and the at least one co-solvent is selected from the group consisting of an alcohol in turn selected from the group consisting of ethanol, butanol, isopropyl alcohol, and combinations thereof.

6. The method of claim 1 where:
    the pre-flush solution comprises the at least one hydrocarbon, and the at least one hydrocarbon is selected from the group consisting of limonene, α-pinene, dipentene, and combinations thereof.

7. The method of claim 1 where the scale inhibitor is selected from the group consisting of phosphonates, inorganic polyphosphates, phosphate esters, organic polymers, polycarboxylic acids, copolymers with chelating groups, and combinations thereof.

8. A scale inhibitor squeeze treatment method, the treatment comprising:
    injecting a pre-flush solution into a wellbore;
    injecting a main treatment solution containing at least one scale inhibitor into the wellbore;
    injecting a post-flush solution into the wellbore;
    shutting-in the well for a period of time; and
    subsequently producing oil from the wellbore;
    where the pre-flush solution comprises:
        at least one organic carbonate solvent selected from the group consisting of glycerol carbonate, dimethyl carbonate, diethyl carbonate, dibutyl carbonate, and combinations thereof;
        an absence of water;
        optionally at least one surfactant;
        optionally at least one co-surfactant;
        optionally at least one co-solvent; and
        optionally at least one hydrocarbon.

9. The method of claim 8 where the at least one organic carbonate is present in the pre-flush solution in an amount ranging from about 10 vol % to about 100 vol %.

10. The method of claim 8 where the scale inhibitor is selected from the group consisting of phosphonates, inorganic polyphosphates, phosphate esters, organic polymers, polycarboxylic acids, copolymers with chelating groups, and combinations thereof.

* * * * *